United States Patent [19]

Seach

[11] 4,256,080
[45] Mar. 17, 1981

[54] COOKING GRILL WITH LID

[76] Inventor: Arden W. Seach, 1828 Congress, Beloit, Wis. 53511

[21] Appl. No.: 916,234

[22] Filed: Jun. 16, 1978

[51] Int. Cl.³ .............................................. A47J 37/00
[52] U.S. Cl. ................................ 126/25 R; 126/25 A; 126/41 R
[58] Field of Search .................. 126/25, 25 A, 304 R, 126/41 R, 9 R; 16/135; 240/334, 335; 74/527, 512, 513, 540, 541; 292/202, 278, 204; 220/379, 335

[56] References Cited

U.S. PATENT DOCUMENTS

| 715,975 | 12/1902 | Karichoff | 74/577 |
|---|---|---|---|
| 851,969 | 4/1907 | Vernon | 220/379 |
| 2,520,578 | 8/1950 | Treloar | 126/25 R |
| 2,659,467 | 11/1953 | Zenner | 74/577 |
| 2,792,773 | 5/1967 | Baker | 126/25 A |
| 3,029,754 | 4/1962 | Doyle | 126/25 R |
| 3,623,380 | 11/1971 | Tomczak | 74/512 |
| 3,935,809 | 2/1976 | Bauer | 126/25 R |

Primary Examiner—Samuel Scott
Assistant Examiner—Wesley S. Ratliff, Jr.

[57] ABSTRACT

A grill such as a Hibachi or barbecue grill has a cover or lid hinged thereto and means for selectively closing the lid over the grill at a desired angle with respect thereto, to protect against wind and regulate the cooking rate.

3 Claims, 5 Drawing Figures

U.S. Patent  Mar. 17, 1981  4,256,080
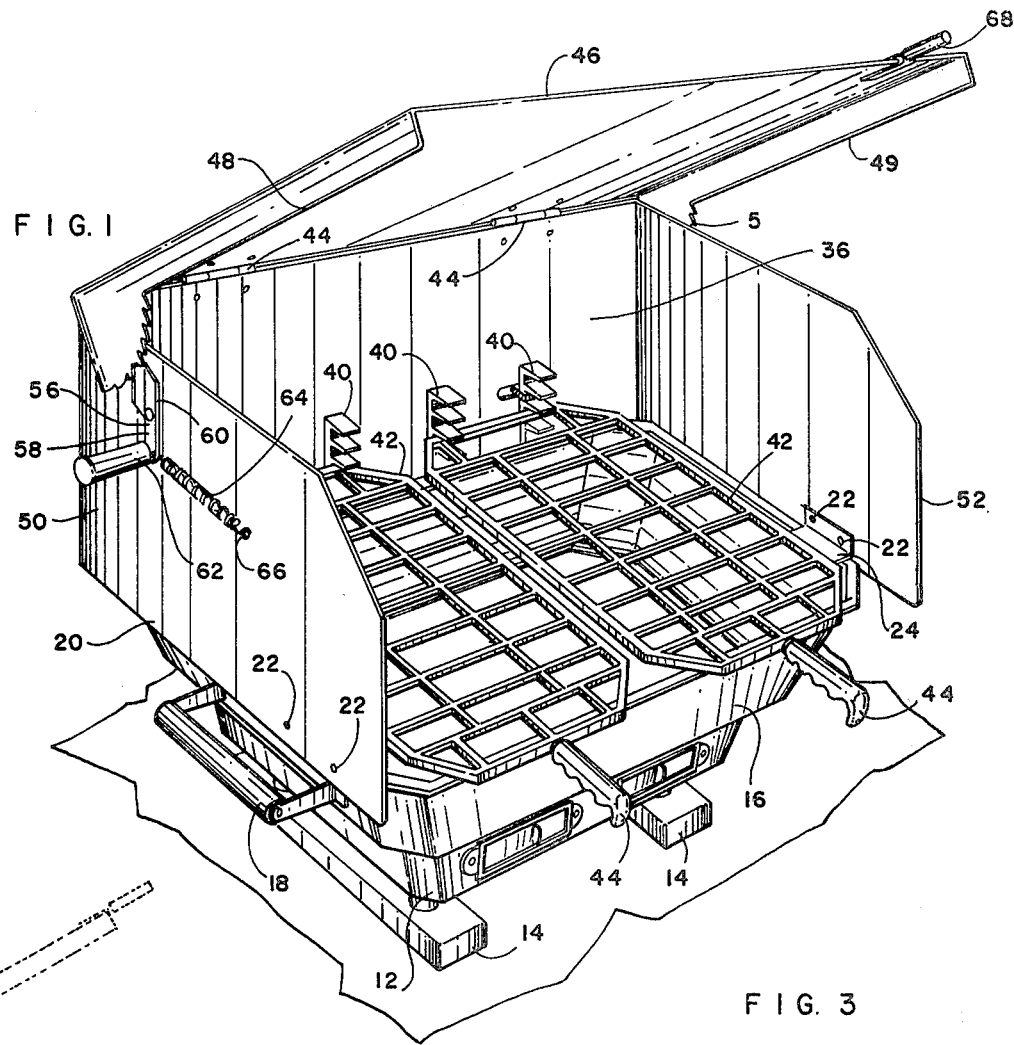
FIG. 1
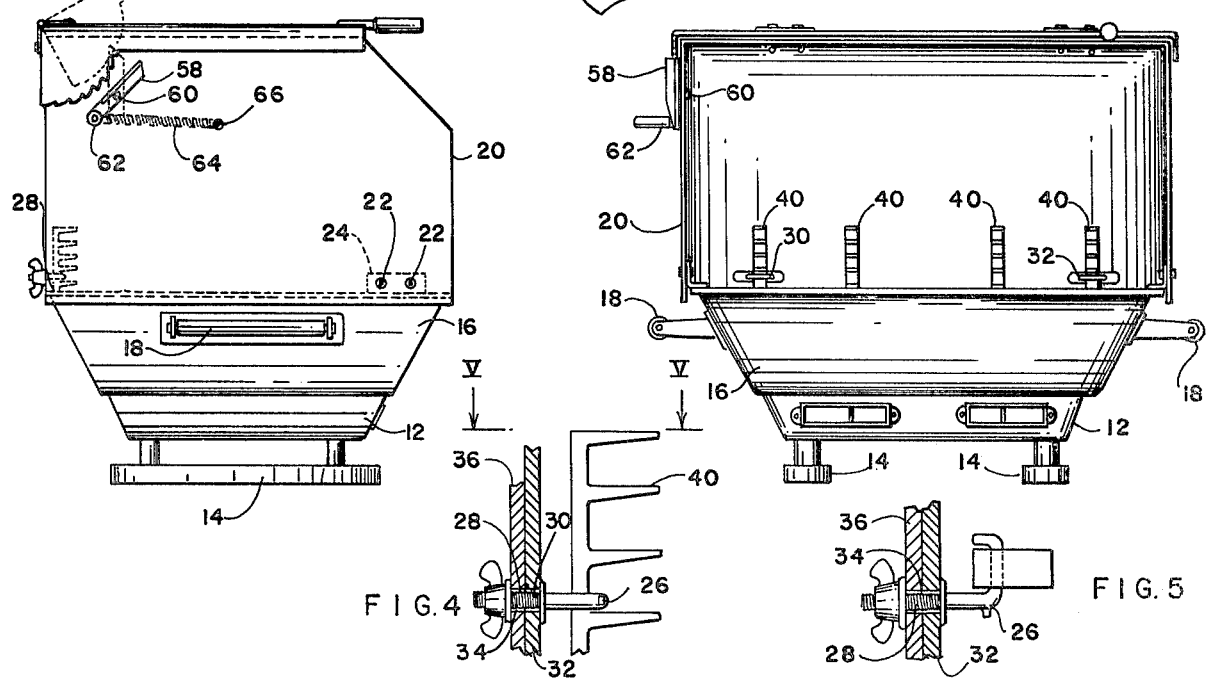
FIG. 2
FIG. 3
FIG. 4
FIG. 5

COOKING GRILL WITH LID

FIELD OF THE INVENTION

This invention relates generally to a wind protecting cover for an outdoor grill.

DESCRIPTION OF THE PRIOR ART

The prior art, as exemplified by U.S. Pat. Nos. 3,538,905; 3,013,551; 4,037,580; 3,852,989; 4,032,662; and 3,809,053 is generally illustrative of the pertinent art but the aforementioned patents are non-applicable to the present invention. While the prior art expedients are generally acceptable for their intended purposes only, they have not proven entirely satisfactory in that they are either complex and expensive to manufacture, or bulky and inconvenient to use, or to operate. As a result of the shortcomings of the prior art, typified by the above, there has developed a substantial need for improvement in this field.

The principal object of this invention is to provide a device or article of this character which combines simplicity, strength and durability in a high degree, together with inexpensiveness of construction owing to a minimum of parts so as to encourage widespread use thereof.

Additional objects and advantages of the invention will be set forth in part in the description which follows and in part will be obvious from the description, or may be realized by practice of the invention, the objects and advantages being realized and attained by means of the instrumentalities and combinations particularly pointed out in the appended claims.

SUMMARY OF THE INVENTION

This invention resides in a grill such as a Hibachi or barbecue grill has a cover or lid hinged thereto and means for selectively closing the lid over the grill at a desired angle with respect thereto, to protect against wind and regulate the cooking rate.

BRIEF DESCRIPTION OF THE DRAWING

In the accompanying drawing, in which is shown one of the various possible illustrative embodiments of this invention, wherein like reference character identify the same or like parts:

FIG. 1 is a view in perspective of a two grid Hibachi equipped with the lid of the invention;

FIG. 2 is a side view with the lid shown in open position by dashed lines;

FIG. 3 is a rear view partly broken away of the Hibachi;

FIG. 4 is a detailed view of the adjustable grid slope holding brackets; and

FIG. 5 is a cross-sectional view taken along line V—V of FIG. 4.

DESCRIPTION OF THE PREFERRED EMBODIMENTS:

With reference to the drawing, there is shown and illustrated a cooking grill with cover constructed in accordance with the principles of the invention and designated generally by reference character 10. The illustrated tangible embodiment of the invention includes a substantially conventional form of outdoor barbecue grill of the double grid Hibachi type comprising a generally rectangular pan shaped shallow bottom 12 supported on legs 14. Above bottom 12 is cooking chamber 16 on the outside of which are mounted handles 18. Surrounding three sides of the cooking chamber 16 is a peripheral metal screen 20 which is secured by screws 22 to angle irons 24 welded to the upper part of chamber 16 on each side. In rear wall 36 kit hooks 26 having threaded ends 28 passing through slits 30 in brackets 32 on chamber 16 and slits 34 in the back wall 36 of screen 20. A wing nut 38 holds the assembly in place.

Hooks 26 secure a pair of racks 40 while similar racks are welded in the central part of rear wall 36. These racks adjustably receive the backs of grids 42 over which is placed the food to be cooked. Grids 42 have a handle 44 at their front end.

Hinges 44 secured to the upper end of rear wall 36 foldably secure lid 46 which has side flanges 48, 49, adapted to fit over the upper ends of side walls 50, 52. The rear surface of flanges 48 forms a toothed arcuate section 54. A spring latch 56 is provided on side wall 50 and includes a lever 58 having an outwardly projecting portion adapted to engage the teeth on section 54. Lever 58 is pivoted on pivot 60 and has a handle 62 and is biased by being connected by spring 64 to pin 66 on side wall 50. A handle 68 is fixed to the front of lid 46.

The lid 46 can be selectively closed over side walls 36, 50, 52 to serve as a wind breaker and to hold the heat so the food can cook faster. The lid 46 operates in conjunction with the grids 42 whose vertical incline can be varied by using racks 40 over the source of heat.

The lid 46 can be retrofitted on existing cooking apparatus. Suitably, lid 46 can be made of sheet metal which is about 0.035 inch thick.

The operation and use of the invention hereinabove described will be evident to those skilled in the art to which it relates from a consideration of the foregoing.

The present invention is believed to accomplish among others all of the objects and advantages herein set forth.

Without further analyses, the foregoing will so fully reveal the gist of this invention that those skilled in the art can by applying current knowledge thereto readily adapt it for various application without omitting certain features which can constitute essential characteristics of the generic or specific aspects of this invention. Therefore, a more lengthy description is deemed unnecessary.

It is intended that various changes may be made in this invention in the practical development thereof, if desired. Such changes are comprehended within the meaning and range of equivalency of the following claims. The invention, therefore, is not to be restricted except as is necessitated by the prior art.

Having thus described the invention, what is claimed as new and to be secured by Letters Patent is:

1. Cooking apparatus comprising a cooking chamber containing a source of heat surrounded by an end wall and two parallel side walls; rack means in said end wall for receiving the rear part of at least one grid at a variable angle; a lid hinged to the upper end of said end wall; said lid having side flanges adapted to fit over the upper ends of said side walls; one of said flanges including an arcuate toothed section; a spring latch on said side wall below said toothed section and adapted to engage said section to selectively close said lid over said walls.

2. The invention as recited in claim 1, wherein said lid has a handle in the front thereof.

3. The invention as recited in claim 1, wherein said apparatus includes two grids.

* * * * *